(12) United States Patent
Easwaran et al.

(10) Patent No.: US 8,049,472 B2
(45) Date of Patent: Nov. 1, 2011

(54) SINGLE INDUCTOR MULTIPLE OUTPUT SWITCHING DEVICES

(75) Inventors: Prakash Easwaran, Bangalore (IN); Rupak Ghayal, Bangalore (IN); Raghavendra Rao Haresamudram, Bangalore (IN)

(73) Assignee: Cosmic Circuits Private Limited, Bangalore (IN)

( * ) Notice: Subject to any disclaimer, the term of this patent is extended or adjusted under 35 U.S.C. 154(b) by 243 days.

(21) Appl. No.: 12/463,388

(22) Filed: May 9, 2009

(65) Prior Publication Data
US 2010/0026267 A1    Feb. 4, 2010

(30) Foreign Application Priority Data
Jul. 29, 2008  (IN) .......................... 1830/CHE/2008

(51) Int. Cl.
 *G05F 1/577*    (2006.01)
(52) U.S. Cl. .................. 323/267; 323/271; 323/283
(58) Field of Classification Search .................. 323/267, 323/268, 271, 272, 282, 283
See application file for complete search history.

(56) References Cited

U.S. PATENT DOCUMENTS

| | | | |
|---|---|---|---|
| 5,617,015 A * | 4/1997 | Goder et al. | 323/282 |
| 6,437,545 B2 * | 8/2002 | Sluijs | 323/222 |
| 6,900,620 B2 * | 5/2005 | Nishimori et al. | 323/222 |
| 7,176,661 B2 * | 2/2007 | Kranz | 323/222 |
| 2006/0220622 A1 * | 10/2006 | Yamanaka et al. | 323/267 |
| 2008/0231115 A1 * | 9/2008 | Cho et al. | 307/41 |
| 2009/0015218 A1 * | 1/2009 | O'Driscoll et al. | 323/267 |

OTHER PUBLICATIONS

Dongsheng Ma; Wing-Hung Ki; Chi-Ying Tsui; Mok, P.K.T., "Single-inductor multiple-output switching converters with time-multiplexing control in discontinuous conduction mode," Solid-State Circuits, IEEE Journal of, vol. 38, No. 1, pp. 89-100, Jan. 2003. doi: 10.1109/JSSC.2002.806279 URL: http://ieeexplore.ieee.org/stamp/stamp.jsp?tp=&arnumber=1158785.*

* cited by examiner

*Primary Examiner* — Adolf Berhane
*Assistant Examiner* — Fred E Finch, III
(74) *Attorney, Agent, or Firm* — Kanika Radhakrishnan Evergreen Valley Law Group, P.C.

(57) ABSTRACT

Single inductor multiple output (SIMO) switching devices with efficient regulating circuits. The SIMO switching device includes a plurality of time division multiplexing (TDM) switches for switching current through an inductor of the SIMO switching device. The plurality of TDM switches produces a plurality of outputs. The SIMO switching device further includes an error calculation circuit operatively coupled to the plurality of outputs for determining a calculated error from the plurality of outputs; a time slot generation circuit for controlling the plurality of TDM switches according to the calculated error; and a pulse width modulation (PWM) control circuit operatively coupled to the time slot generation circuit for controlling a plurality of PWM switches of a switching stage of the SIMO switching device in a continuous conduction mode (CCM) of operation. The PWM switches are controlled according to the time slots generated by the time slot generation circuit.

20 Claims, 6 Drawing Sheets

SINGLE INDUCTOR MULTIPLE OUTPUT SWITCHING DEVICES

BACKGROUND

This patent application claims priority from Indian Non provisional patent application number 1830/CHE/2008, filed on Jul. 29, 2008 entitled "SINGLE INDUCTOR MULTIPLE OUTPUT SWITCHING DEVICES" and assigned to Cosmic Circuits Private Limited, 303, A Block, AECS Layout, Kundalahalli, Bangalore-560037, India, which is hereby incorporated in its entirety.

FIELD

Embodiments of the invention relate generally to switching devices and more particularly to regulating single inductor multiple output (SIMO) switching devices.

PRIOR ART

Many of today's battery powered consumer products require more than one power supply voltage level to operate. For example, a central processing unit (CPU) for a laptop may be designed to operate at 2.9 volts while the hard disk drive operates at 5 volts. Instead of providing several sources of power supply, these products typically use a single power supply source and generate other supply levels with DC to DC converters. The DC to DC conversion is typically performed by the power supply regulator circuitry that is universally provided in battery operated electronic products.

There are basically two types of power supply regulators, linear and switching regulators. Linear regulators rely on a linear control element with feedback to regulate a constant voltage. When a linear regulator is used as a DC to DC converter, there is an appreciable amount of power dissipation.

Typically in switching regulators, a single inductor can be used to generate a single output. Further, in switching regulators, a single inductor can be used to generate multiple outputs such that current in the inductor can be switched between multiple outputs to regulate each of the multiple outputs according to a clock signal. A set of switches are used to switch the current in the inductor between the multiple outputs. Such switching regulators are single inductor multiple output (SIMO) switching regulators. Examples of SIMO switching regulators include a single inductor dual output (SIDO) switching regulator, a single inductor triple output (SITO) switching regulator and a single inductor quadruple output (SIQO) switching regulator.

In a SIDO switching regulator, a set of switches is used to control the ramping up and ramping down of the current in the inductor. During ramping up, current is built in the inductor and during ramping down, the built current is channeled to the plurality of outputs.

SIMO switching regulators can be operated in Continuous Conduction Mode (CCM) and Discontinuous Conduction Mode (DCM). In DCM, inductor current of the switching regulator drops to zero and remains constant until the next switching cycle begins. In CCM, the inductor current is ramped down until the end of the switching cycle without dropping to zero. For a given load, the peak inductor current level is usually higher in DCM. Overall performance and efficiency of the SIMO is better in CCM since the peak inductor current level is minimized.

SIMO switching regulators can also be operated in pseudo-Continuous Conduction Mode of operation (pseudo-CCM). In pseudo-CCM, the current through the inductor is ramped down until it reaches a pre-determined value (I pedestal) and held constant until the next switching cycle begins. This enables support for higher load currents but for a given load current, the peak in the inductor current is higher and the efficiency of the overall system remains poorer when compared with CCM.

Cross regulation may be defined as a phenomenon in which a disturbance caused to one of the sub-converters in a SIMO switching regulator causes a disturbance to other sub-converters. An example of cross-regulation is when a change in the load current on one sub-converter causes a disturbance on the other sub-converter in a SIDO switching regulator.

In a SIDO switching regulator operating in CCM, if the time slots for the two outputs are fixed, any disturbance caused to one sub-converter would cause a disturbance in the residual inductor current at the end of its time-slot. Such a disturbance in residual current would further disturb the other sub-converter, thus resulting in cross-regulation. This places a limit on the asymmetry of the two outputs and their load current that the converter can support without cross-regulation. For example, there would not be any cross-regulation for equal outputs and equal load currents.

In light of the foregoing discussion, there is a need to provide an efficient regulating mechanism in SIMO switching devices which can eliminate cross regulation when all sub-converters operate in CCM.

SUMMARY

Embodiments of the invention described herein provide systems and methods for regulating a single inductor multiple output (SIMO) switching device to minimize cross regulation.

An exemplary embodiment of the invention provides a SIMO switching device. The SIMO switching device includes a plurality of time division multiplexing (TDM) switches for switching current from an inductor of the SIMO switching device. The plurality of TDM switches produces a plurality of outputs. The SIMO switching device further includes an error calculation circuit operatively coupled to the plurality of outputs for determining a calculated error in the plurality of outputs which senses a change in output voltages of the plurality of outputs; a time slot generation circuit that generates a plurality of time slots for controlling the plurality of TDM switches according to the calculated error; and a pulse width modulation (PWM) control circuit operatively coupled to the time slot generation circuit for controlling a plurality of PWM switches of a switching stage of the SIMO switching device.

An exemplary embodiment of the invention provides a method for regulating a SIMO switching device. A calculated error from errors of a plurality of outputs which senses a change in output voltages of the plurality of outputs in the SIMO switching device is determined. Further, a time slot is generated according to the calculated error and current is switched through an inductor of the SIMO switching device dynamically according to the time slot.

Other aspects and example embodiments are provided in the Figures and the Detailed Description that follows.

DETAILED DESCRIPTION OF THE EMBODIMENTS

Embodiments of the invention described herein provide a system and method for regulating a single inductor multiple output (SIMO) switching device so as to minimize cross regulation. Various embodiments of the invention are explained using a switching regulator as an example of a switching device.

An embodiment of the invention provides a regulating circuit for SIMO switching regulators. In an embodiment of the invention, time slots for switching between the outputs in the SIMO switching regulator are controlled using pulse width modulation (PWM) errors in the outputs. This provides significant advantages in terms of cross regulation in continuous conduction mode (CCM) of operation of the SIMO switching regulator across all loads and output voltage conditions. Further, peak inductor current is minimized in CCM.

It will be appreciated that CCM operation of the SIMO switching regulator according to various embodiments of the invention is described only by way of illustration and not limitation. Those knowledgeable in the art will recognize that various embodiments of the invention can also be implemented in discontinuous conduction mode (DCM) of operation.

Figure 1:
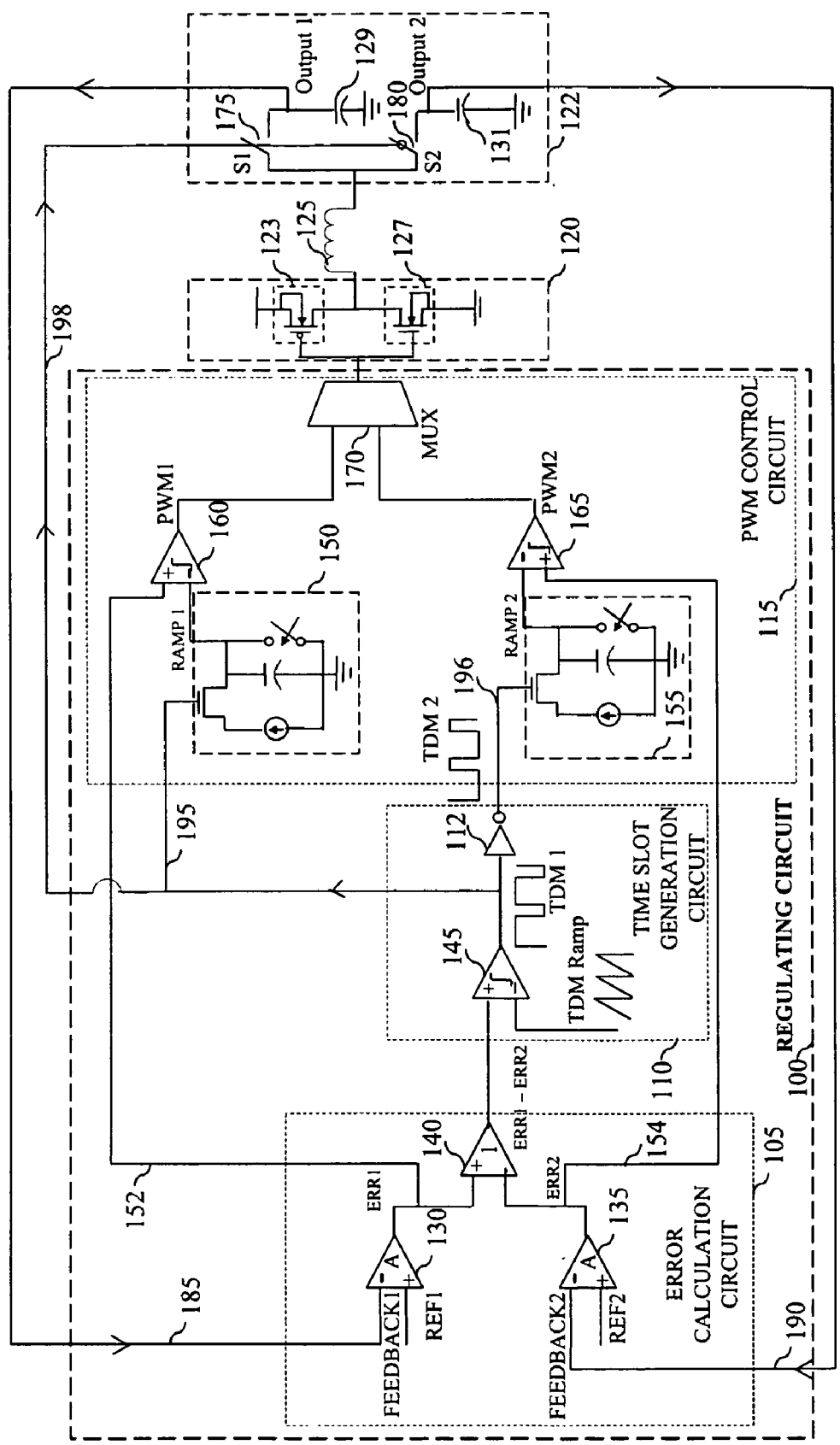
FIG. 1 is a schematic diagram of an exemplary implementation of a regulating circuit for a SIDO switching regulator according an embodiment of the invention.

FIG. 1 illustrates an exemplary implementation of a regulating circuit 100 for a SIDO switching regulator according an embodiment of the invention. The regulating circuit includes an error calculation circuit 105, a time slot generation circuit 110, and a PWM control circuit 115 operatively coupled to each other. The regulating circuit is connected to a PWM switching stage 120 and a TDM switching stage 122 of a SIDO switching regulator. The PWM switching stage includes two switching transistors 123 and 127, where a source of transistor 123 is connected to a power node, a drain connected to a drain of transistor 127 at a junction point. A source of transistor 127 is connected to a common return. Gates of transistors 123 and 127 are connected to an output of a multiplexer 170. An inductor 125 is connected between the junction point and two TDM switches 175 and 180. The switch 175 is connected to a capacitor 129 to provide Output 1. The switch 180 is connected to a capacitor 131 to provide Output 2. Divided down voltages of these outputs using a resistance divider are supplied to the error calculation circuit as feedback voltages 1 and 2 on lines 185 and 190 respectively. The error calculation circuit includes a first error amplifier 130 and a second error amplifier 135. A negative input of the first error amplifier 130 receives feedback voltage 1. A positive input of the first error amplifier receives a first reference voltage, REF1. Similarly, a second error amplifier 135 has a negative input that receives feedback voltage 2 and a positive input that receives a second reference voltage, REF2. These error amplifiers compare the respective feedback signals and reference signals and generate respective PWM error signals ERR1 and ERR2. These error signals are supplied to a third amplifier 140, referred to herein as an error calculator. A positive input of the error calculator receives the signal ERR1 and a negative input receives the signal ERR2. The error calculator provides a calculated error signal indicative of any difference between the two individual error signals.

The output of the error calculation circuit is supplied to the time slot generation circuit 110. The time slot generation circuit includes a comparator 145. The comparator 145 receives the calculated error signal from the error calculation circuit as a positive input, and a time division multiplexing (TDM) ramp signal as a negative input. The time slot generation circuit generates two outputs. A first output of the time slot generation circuit is active (i.e. TDM1 is active) when the calculated error is greater than TDM ramp signal. A second output includes an inverted signal of the first output signal which is generated using an inverter 112. Outputs of the time slot generation circuit are supplied to the PWM control circuit 115. Further, the first output of the time slot generation circuit is supplied to the TDM switches 175, 180.

The PWM control circuit includes two ramp generation circuits 150, 155. The ramp generation circuits receive the two outputs of the time slot generation circuit and generate two PWM ramp signals, for example RAMP1 and RAMP2. Further, the PWM control circuit includes a first comparator 160 and a second comparator 165. A negative terminal of the first comparator receives the RAMP1 signal and a negative terminal of the second comparator receives the RAMP2 signal. A positive terminal of the first comparator receives the signal ERR1 through a line 152, and a positive terminal of the second comparator receives the signal ERR2 through a line 154. Outputs of the comparators 160, 165 (PWM1 and PWM2, respectively) are supplied to a multiplexer 170. An output of the multiplexer is connected to the PWM switching stage 120. The operation of regulating circuit 100 is explained in the following paragraphs.

The feedback voltages, FEEDBACK1 and FEEDBACK2 are compared with the reference voltages, REF1 and REF2 in the error calculation circuit using the error amplifiers 130 and 135. The error amplifiers amplify the differences between the feedback voltages and their respective reference voltages and generate the individual PWM error signals ERR1 and ERR2. The error calculator 140 calculates an error signal from ERR1 and ERR2. In the embodiment shown in FIG. 1, the calculated error is determined by taking a difference of ERR1 and ERR2 (ERR1−ERR2). This calculated error is converted into time information in the time slot generating circuit 110.

The comparator 145 of the time slot generation circuit compares the calculated error with a ramp signal of fixed time period and generates time slots (TDM slots) for switching current through the inductor 125 between the two outputs. The TDM slots (TDM 1 and TDM 2) are generated by dividing a total time period T into two slots. In another embodiment of the invention, the calculated error can be converted into time information in digital domain using a counter and a clock signal of known time period. The TDM slots are supplied to the PWM control circuit and to the TDM switches. Ramp signals are generated in the PWM control circuit from the TDM slots. Further, TDM switches 175, 180 are controlled according to the TDM slots by the time slot generation circuit. The TDM switches allow the current in the inductor to be time division multiplexed between two output capacitors 129, 131 according to the TDM slots. The PWM switches ramp up and ramp down the current in the inductor 125 in each TDM slot.

In an embodiment of the invention, if ERR 1=ERR 2, total time period T is divided in such a way that the TDM slot for output 1 is equal to the TDM slot for output 2 and also equal to half of the total available time period T, i.e., If $ERR1-ERR2=0$, then $$TDM1=T/2; TDM2=T-TDM1;$$

Wherein ERR1, ERR2 are the PWM errors in output 1 and output 2 respectively;
TDM1, TDM2 are the time slots for switching between output 1 and output 2 respectively; and
T is the switching cycle period available for complete SIDO or SIMO.

In an embodiment of the invention, if ERR1 is not equal to ERR 2, TDM1 (time slot for first output) is increased if PWM error ERR1 is larger than ERR2 and vice versa. The TDM slots can be derived from PWM errors by performing different mathematical functions on PWM errors. It will be appreciated that determining TDM slots of the outputs by taking difference of the PWM errors (ERR1−ERR2) and increasing the TDM1 slot if ERR1−ERR2 is positive and in proportion to ERR1−ERR2 according to an embodiment of the invention is provided only by way of illustration and not by limitation. Those knowledgeable in the art will recognize that there can be variety of ways of calculating the TDM slots by performing different functions on ERR1 and ERR2.

Figure 3:
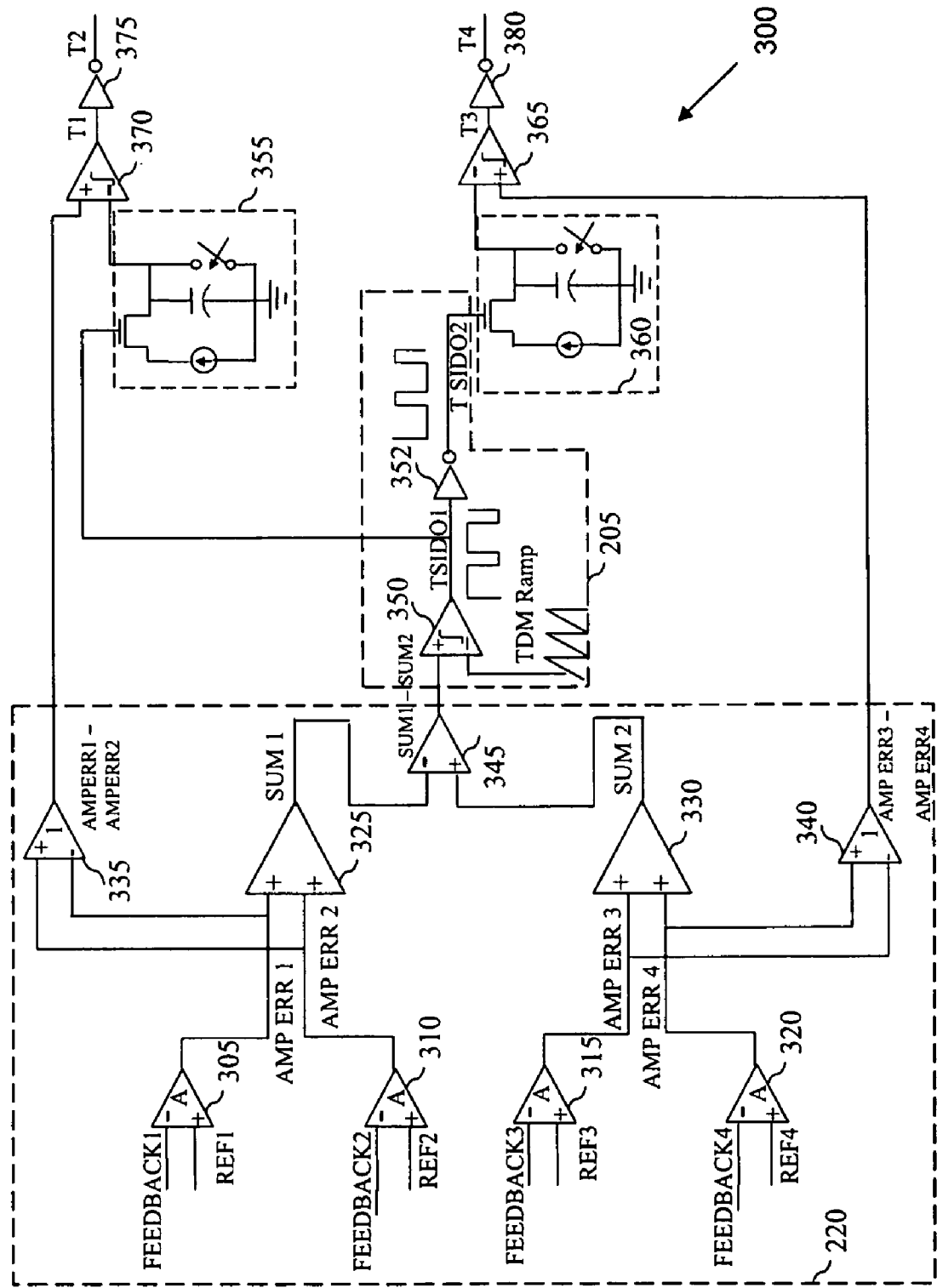
FIG. 3 is a schematic diagram of an exemplary implementation of a TDM loop of a regulating circuit for a SIMO switching regulator according an embodiment of the invention.
Figure 4:
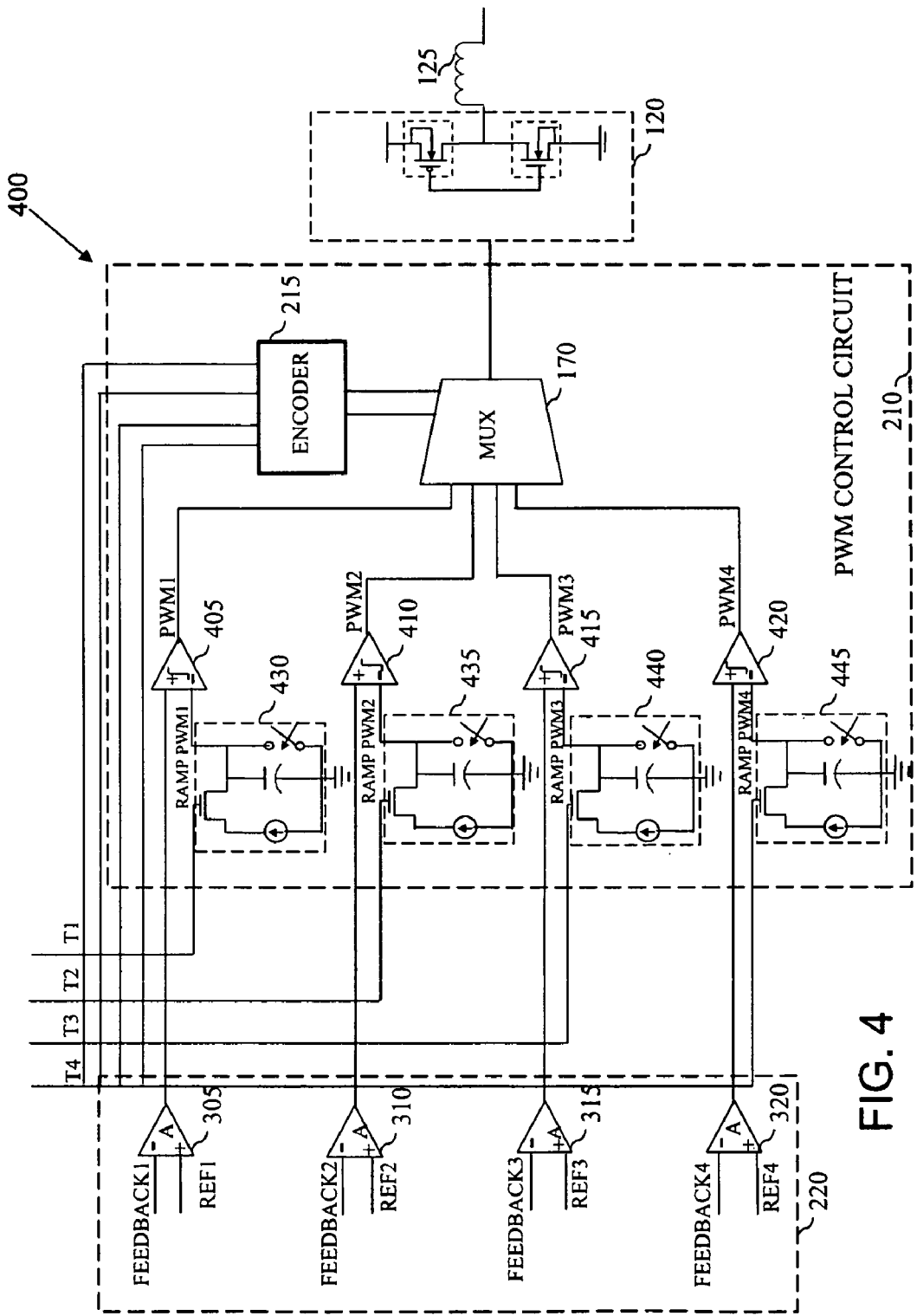
FIG. 4 is a block diagram of an exemplary implementation of a PWM loop of a regulating circuit for a SIMO switching regulator according an embodiment of the invention.

As explained earlier, the TDM slots are determined by comparing the difference of two PWM errors (ERR1−ERR2) with a ramp signal of time period T. These TDM slot values TDM1 and TDM2 (T−TDM1) are used in the PWM loops (PWM and TDM loops for the regulating circuit are illustrated in FIG. 3 and FIG. 4 respectively) for ramp signal generation. Two ramp generation circuits 150 and 155, in the PWM control circuit, generate ramp signals (PWM ramp signals) corresponding to TDM1 and TDM2 time slot values. The ramp signal for each PWM loop is valid only during the time slot of that loop. The slopes of both PWM ramp signals are equal and kept constant. The amplitude of each PWM ramp signal varies in proportional to the time slot allotted to that ramp signal.

The amplified PWM error signals ERR1 and ERR2 are compared with the respective PWM ramp signals RAMP1 and RAMP2 by the comparators 160 and 165, respectively. The outputs of these two comparators are connected to a multiplexer 170 which controls the PWM transistors 123 and 127. The PWM switches 175 and 180 control the current in the inductor as per the duty cycle requirements of the individual PWM loops for the two outputs. The inductor current is ramped up and ramped down in each TDM slot using the transistors 123 and 127. The ramp up time in each slot is proportional to the PWM error (ERR1 or ERR2). The ramp down time is either for the remaining time of the TDM slot or until the inductor current reaches zero. Since inductor current is allowed to ramp up and ramp down in each TDM slot, the peak current built in the inductor can be considerably reduced.

According to this embodiment of the invention, varying time slots can be allotted to the respective outputs 1 and 2 depending on the errors in the PWM loop (ERR1 and ERR2). If the time slots are allowed to vary in proportion to the PWM errors or in same direction as PWM errors, then the cross regulation due to difference in load current can be significantly reduced. The output having a larger load current is allotted a larger time slot than the output having a smaller load current and hence the residual current for the inductor adjusts itself because of the feedback loop such that little or no cross regulation occurs. As the errors in the PWM loop already incorporate the duty cycle requirement for the load currents and the set output voltages of both outputs, the distribution of TDM slots based on PWM errors results in extremely small cross regulation.

According to an embodiment of the invention, the TDM loop uses PWM errors and hence shares the same loop components (error amplifiers 130, 135, error calculator 140 and comparator 145) as the PWM loop. As the loops and gain elements are same, the mismatch between the loops is too small to be significant. Any mismatch between the PWM loop (comparators 160, 165) and TDM loop (error calculator 140 and comparator 145) gets divided by the error amplifier gain, with the result that the outputs are accurately controlled.

It will be appreciated that the switching stage of the switching regulator including metal oxide semiconductor (MOS) transistors in various embodiments of the invention is described by way of illustration and not limitation. Any type of switches can be used in the switching stage of the switching regulator.

It will be appreciated that sharing the loop components is described by way of illustration and not limitation. An example of another implementation includes two separate loops for PWM and TDM control. This is illustrated in FIG. 3 and FIG. 4. Further, the operation of a regulating circuit for a SIDO switching regulator is illustrated using graphs in FIG. 6a and FIG. 6b.

Figure 2:
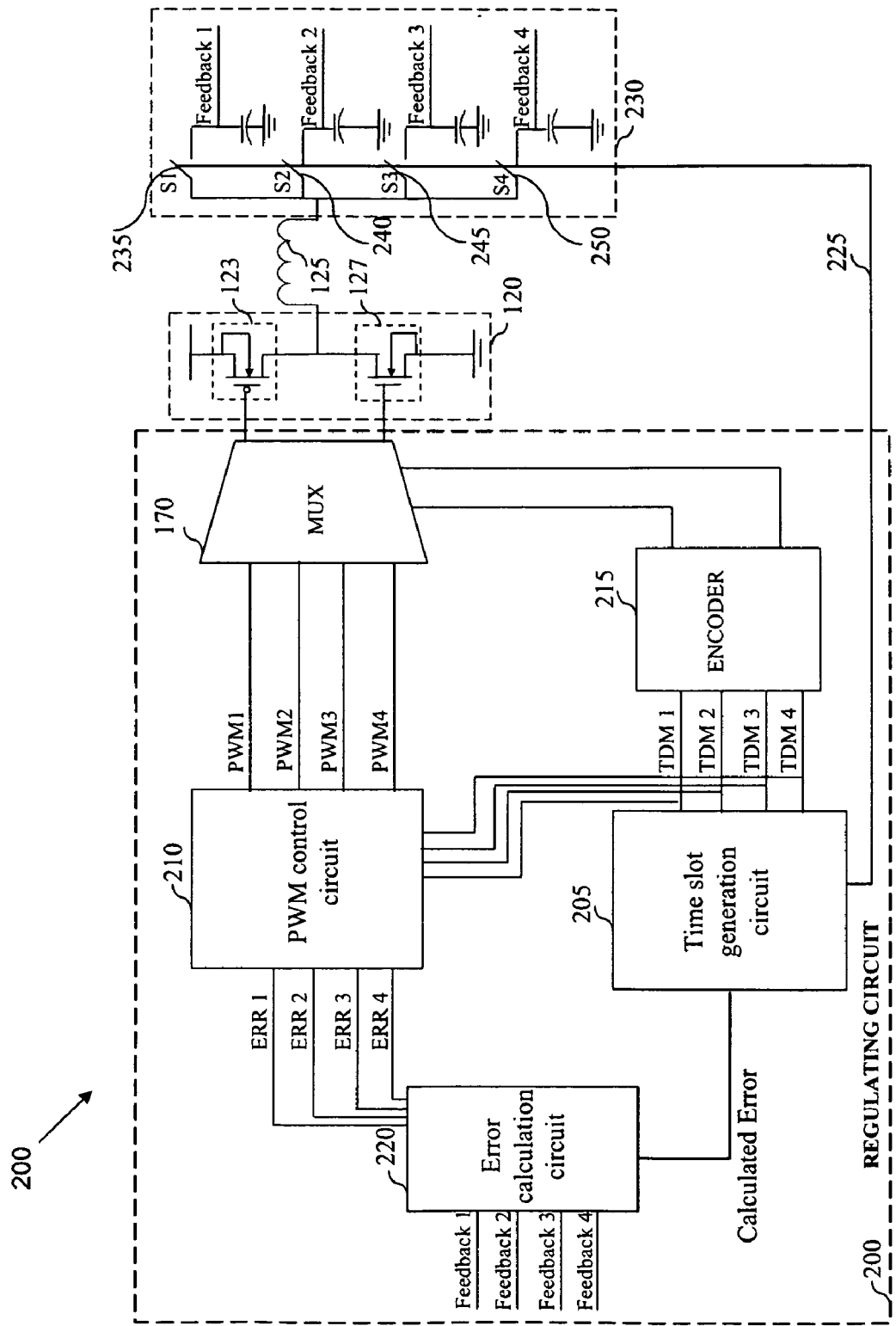
FIG. 2 is a block diagram of an exemplary implementation of a regulating circuit for a SIMO switching regulator according an embodiment of the invention.

The principles of the invention as described above and illustrated in FIG. 1 can be extended to single inductor multiple output devices. For example, a single inductor quadruple output (SIQO) switching regulator embodying the invention is shown in FIG. 2. The regulating circuit 200 includes an error calculation circuit 220, a time slot generation circuit 205, a PWM control circuit 210, an encoder 215 and a multiplexer 170. The regulation circuit 200 is connected to a TDM switching stage 230 having four TDM switches 235, 240, 245 and 250 connected to an inductor 125. The TDM switching stage generates four outputs. These outputs are supplied to the error calculation circuit 220 as feedback voltages 1 through 4. One set of outputs of the error calculation block includes PWM error signals ERR1, ERR2, ERR and ERR4 which are supplied to a PWM control circuit 210. Another output of the error calculation circuit includes a calculated error signal which is supplied to a time slot generation circuit 205. For the sake of simplicity, circuit elements of the time slot generation circuit and the PWM control circuit 210 are not shown in FIG. 2. However, FIG. 3 illustrates the circuit elements of the time slot generation circuit and FIG. 4 illustrates the circuit elements of the PWM control circuit.

The time slot generation circuit generates time slots TDM1, TDM2, TDM3, and TDM4. These time slots are supplied to an encoder 215, and to the PWM control circuit, and to the four TDM switches 235, 240, 245 and 250. Outputs of the encoder are supplied to a multiplexer 170. Outputs of the PWM control circuit, for example PWM 1, PWM2, PWM3 and PWM4 are also supplied to the multiplexer. Outputs of the multiplexer are connected to the PWM switching stage 120. The PWM switching stage is connected to the inductor. Operation of the regulating circuit 200 is explained in the following paragraphs.

The error calculation circuit, time slot generation circuit and PWM control circuit perform same functions as explained in the description of FIG. 1. Reiterating the functions, the error calculation circuit compares the feedback voltages with a reference voltage and amplifies the difference to generate individual PWM errors (ERR1, ERR2, ERR3 and ERR 4). The time slot generation circuit 205 determines the TDM slots (TDM1, TDM2, TDM3 and TDM 4) for switching the current through the inductor using the four TDM switches. TDM slots are generated by comparing the calculated error signal of the four PWM errors with TDM ramp signals generated for the time as controlled by time slot input for that stage. Generating TDM slots for a SIQO switching regulator is further explained in detail in FIG. 3. The TDM slots are used to control the TDM switches of the TDM switching stage.

Further, the PWM control circuit generates PWM ramp signals using the TDM slots. PWM ramp signals are compared with the individual PWM error signals to generate the PWM control signals PWM 1, PWM2, PWM3 and PWM4. Generating PWM control signals for a SIQO switching regulator is further explained in detail in FIG. 4. The multiplexer receives the PWM control signals and drives the PWM switches 123, 127 of the PWM switching stage 120 in their respective TDM slots.

FIG. 3 illustrates an exemplary implementation of a TDM loop 300 of the regulating circuit 200 for a SIQO switching regulator according to an embodiment of the invention. The regulating circuit includes the error calculation circuit 220 and time slot generation circuit 205. The error calculation circuit includes four error amplifiers 305, 310, 315 and 320 receiving feedback voltages, for example feedback 1, feedback 2, feedback 3 and feedback 4 as negative inputs from four outputs (not shown in FIG. 3) of the SIQO switching regulator. The error amplifiers also receive four reference voltages REF1, REF2, REF3 and REF4 as positive inputs. The error amplifiers generate individual PWM error signals AMP ERR1, AMP ERR2, AMP ERR3 and AMP ERR4. The amplified PWM errors are supplied to two summing amplifiers 325 and 330. Outputs of the summing amplifiers, for example SUM1 and SUM2, are supplied to an error calculator 345. The error calculator generates a calculated error signal, for example SUM1−SUM2. The calculated error signal is supplied to the time slot generation circuit 205. A comparator 350 in the time slot generation circuit receives the calculated error as a positive input. A TDM ramp signal of fixed time period is supplied to the comparator 350 as a negative input. The comparator 350 generates a TDM slot TSIDO1. The TDM slot TSIDO1 is supplied to an inverter 352. TDM slots TSIDO1 and TSIDO2 are supplied to two TDM ramp generation circuits 355 and 360. Two outputs of the TDM ramp generation circuits are supplied to the negative inputs of two comparators 365 and 370.

Further, an amplifier 335 receives the PWM error signals AMP ERR1, AMP ERR2 and generates an output, for example ERR1−ERR2. This output is supplied to a positive input of the comparator 370. Similarly, another amplifier 340 receives the PWM error signals AMP ERR3, AMP ERR4 and generates an output, for example ERR3−ERR4. This output is supplied to a positive input of the comparator 365. Comparator 370 generates TDM slot T1 and comparator 365 generates TDM slot T3. TDM slots T1 and T3 are supplied to inverters 375 and 380 respectively. Inverter 375 generates an output, for example TDM slot T2. Similarly, inverter 380 generates an output, for example TDM slot T4. Operation of the TDM loop is explained in the following paragraphs.

Generally for a SIQO switching regulator, TDM slots can be generated by performing a binary search or a sequential search with the individual PWM errors. The total time slot (T) is first divided in two TDM slots, for example TSIDO1 and TSIDO2 assuming that a SIQO switching regulator can be considered as two SIDO switching regulators. These two TDM slots are derived by comparing PWM error signals AMP ERR1+AMP ERR2 (SUM1) and AMP ERR3+AMP ERR4 (SUM2). Difference between SUM1 and SUM2 can be used to generate time slots TSIDO1 and TSIDO2. Further, ramp signal generated for time equal to TSIDO1 is compared with the difference of PWM error signals AMP ERR1 and AMP ERR2 (AMP ERR1−AMP ERR2) to generate TDM slot T1. Similarly, ramp signal generated for time equal to TSIDO2 is compared with the difference of PWM error signals AMP ERR3 and AMP ERR4 (AMP ERR3−AMP ERR4) to generate TDM slot T3. TDM slots T2 and T4 are generated by inverting the time slots T1 and T3 respectively. This is performed as a binary search from the top of a tree of PWM errors. The binary search is performed for all four outputs are and the output (sub-converter) with higher PWM error is allotted with higher TDM slot. Several other search schemes can also be used to determine TDM slots and one such example is a sequential search of the PWM errors, for example (AMPERR1+AMPERR2+AMPERR3)/3 can be compared with AMPERR4 and TDM slot for AMPERR4 can be determined. The remaining time period [(AMPERR1+AMPERR2)/2] can be compared with AMPERR3 and TDM slot for AMPERR3 can be determined. Similarly the TDM slots for AMPERR1 and AMPERR2 can also be determined.

The error amplifiers 305, 310, 315 and 320 of the error calculation circuit compare the feedback voltages for each output of the SIQO switching regulator and corresponding reference voltages (REF1, REF2, REF3 and REF4) to generate individual PWM error signals, AMP ERR1, AMP ERR2, AMP ERR3 and AMP ERR4. To determine SUM1, the PWM error signals AMP ERR1 and AMP ERR2 are supplied to a summing amplifier 325. The summing amplifier adds the amplified error signals to generate SUM1. Similarly, to determine SUM2, PWM error signals AMP ERR3 and AMP ERR4 is added using another summing amplifier 330. Further, the difference between SUM1 and SUM2 is calculated using the error calculator 345 to determine the calculated error. The calculated error is converted to time information by comparing SUM1 and SUM2 (SUM1−SUM2) with a TDM ramp signal of fixed time period.

Using similar principles of a SIDO switching regulator as illustrated in FIG. 1, TDM slot TSIDO1 is generated. TDM slot TSIDO2 is an inverted signal of the TSIDO1 which is generated using the inverter 352. These TDM slots are used to generate a set of TDM ramp signals, for example RAMP TDM12 and RAMP TDM34 using ramp generation circuits 355,360. Comparators 365 and 370 receive RAMP TDM12 and RAMP TDM34 respectively. Comparators 365 and 370 also receive error signals including the difference between PWM error signals AMPERR1, AMP ERR2 and AMP ERR3, AMP ERR4 respectively. Comparator 370 compares the error signal AMPERR1−AMPERR2 with a ramp signal RAMP TDM12 and generates TDM slot for the first output of the SIQO switching regulator, for example T1. Similarly comparator 365 compares the error signal AMPERR3−AMPERR4 with ramp signal RAMP TDM34 and generates TDM slot for the third output, for example T3. TDM slots for the second and fourth outputs can be determined by inverting T1 and T3 using an inverters 375 and 380 respectively. The outputs of the inverters include the TDM slots T2 and T4.

FIG. 4 illustrates an exemplary implementation of a PWM loop 400 of the regulating circuit 200 for a SIQO switching regulator according to an embodiment of the invention. The PWM loop includes the PWM control circuit 210 and the PWM switching stage 120. TDM slots for four outputs T1, T2, T3 and T4 can be determined as explained in the aforementioned paragraphs under the description of FIG. 3. These TDM slots are connected to four ramp generation circuits 430, 435, 440, 445 in the PWM control circuit. TDM slots are also connected to the encoder 215. Outputs of the encoder are connected to the multiplexer 170.

Further, outputs of these ramp generation circuits are supplied to negative inputs of four comparators 405, 410, 415 and 420. PWM error signals from the error calculation circuit 220 are supplied to the four comparators as a positive input. Outputs of the four comparators are connected to the multiplexer 170. An output of the multiplexer is connected to the PWM switching stage 120.

In an embodiment of the invention, TDM slots are used to generate PWM ramp signals for example RAMP PWM1, RAMP PWM2, RAMP PWM3 and RAMP PWM4. PWM error signals from the error calculation circuit 220 are compared with the respective ramp signals to generate PWM control signals, for example PWM1, PWM2, PWM 3 and PWM4. The PWM control signals are used to drive the PWM switches of the PWM switching stage 120 using the multiplexer according to each TDM slot.

Figure 5:
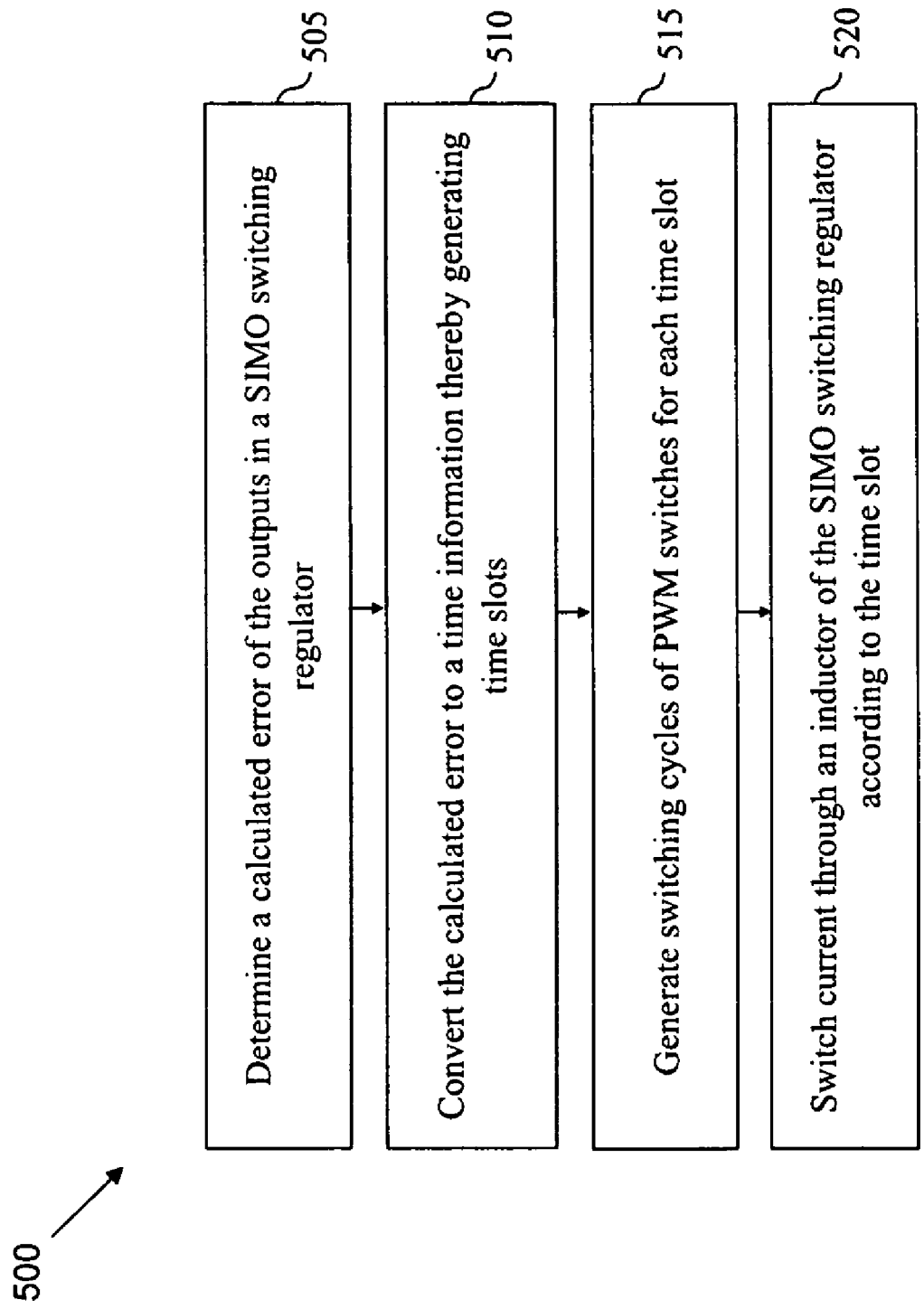
FIG. 5 is a flow diagram illustrating a method for controlling the outputs in a SIMO switching regulator according to an embodiment of the invention.

FIG. 5 is a flow diagram illustrating a method 500 for controlling the outputs in a SIMO switching regulator according to an embodiment of the invention. At step 505, a calculated error of the outputs in the SIMO switching regulator is determined. Calculated error includes an aggregated error of the individual PWM errors. As explained earlier the calculated error can be determined by comparing PWM errors of the set of outputs according to various embodiments of the invention. In an embodiment of the invention, calculated error in a SIDO switching regulator can be determined by taking the difference of the two PWM errors. In another embodiment of the invention, calculated error in a SIQO switching regulator can be determined by performing a sequential search of the four PWM errors.

The calculated error is converted to time information thereby generating time slots (TDM slots) at step 510. Various time slot generation circuits can be used to convert the calculated error to the time information and generate time slots. In an embodiment of the invention, a TDM ramp signal with a fixed time period is used for conversion. In another embodiment of the invention, conversion can be performed in digital domain with a counter and a clock signal of a known time period. The time slot generation circuit 110 of an embodiment of the invention may be used to implement step 510. Further, at step 515, switching cycles of PWM switches are generated for each time slot (TDM slot).

At step 520, current is switched through an inductor of the SIMO switching regulator according to the time slot. Time slots for switching current from an inductor of the SIMO switching regulator is controlled according to the calculated error. The method 500 enables the SIMO switching regulator to operate with minimum peak current level in the inductor of the switching regulator and with a better overall efficiency of the system. Since current in the inductor is ramped up and ramped down for each time slot, peak current level in the inductor is minimized with minimum cross regulation of the outputs of the switching regulator.

Figure 6A:
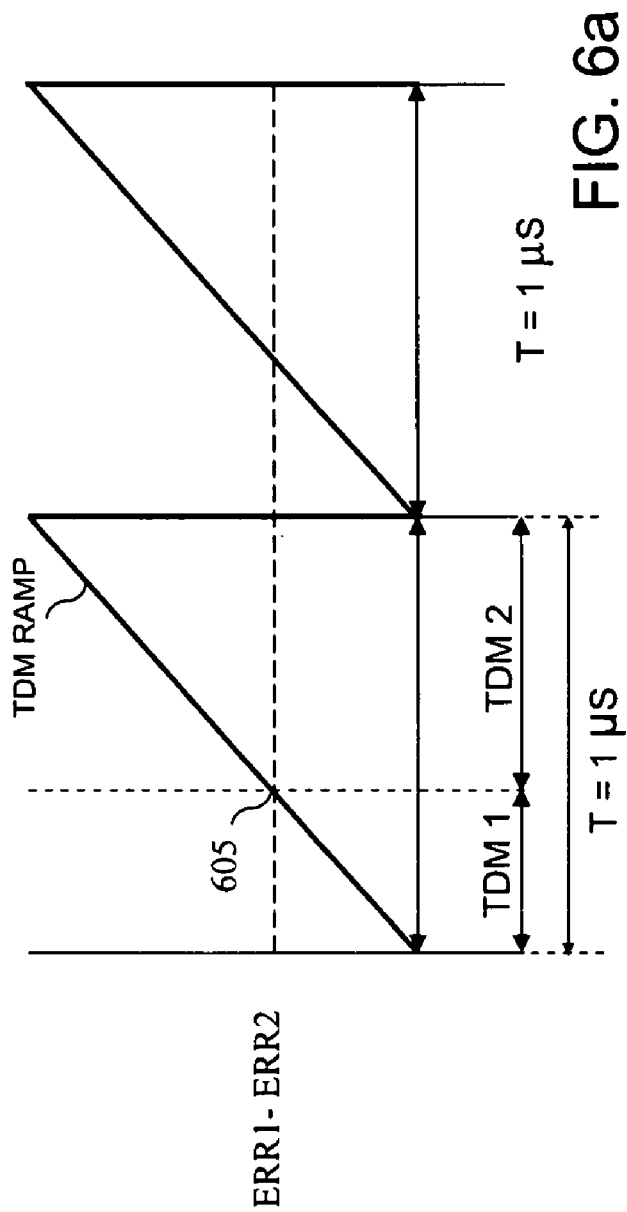
FIG. 6a and FIG. 6b are graphs illustrating the operation of SIDO switching regulator of FIG. 1.
Figure 6B:
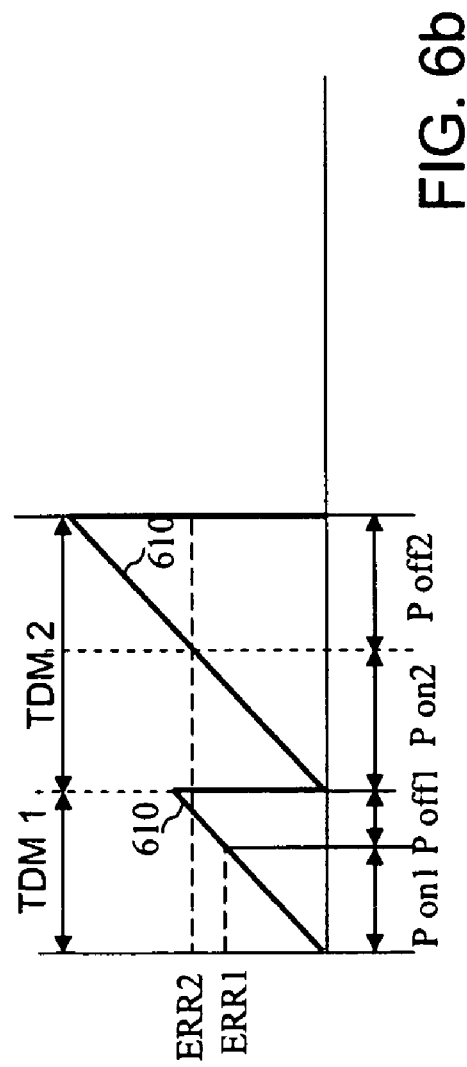

FIG. 6a and FIG. 6b are graphs illustrating the operation of SIDO switching regulator of FIG. 1. FIG. 6a illustrates how TDM slots are generated in the time slot generation circuit 110. FIG. 6b illustrates how TDM slots are used in the PWM control circuit 115 to control the PWM switches of the PWM switching stage.

FIG. 6a graph includes a TDM ramp signal of FIG. 1 with a switching cycle of fixed total time period (T) of 1 microsecond (μs). In an embodiment of the invention, time period T has to be divided appropriately according to the PWM errors to generate TDM slots TDM1 and TDM2 in an embodiment of the invention. To generate TDM slots, the calculated error signal from the error calculator 140 is compared with the TDM ramp signal. Until ERR 1 in the calculated error signal crosses the TDM ramp signal at point 605 in the graph, TDM 1 slot is generated for that time period. The rest of the time period is allocated for TDM2 slot. In this way, the output of the SIDO switching regulator with higher PWM error gets higher TDM slot than the other output.

Further, TDM slots are supplied to the PWM control circuit 115 and PWM ramp signals are generated for each TDM slot. These ramp signals are labeled as 610 in FIG. 6b. The ramp signals 610 are compared with PWM error signals ERR1 and ERR2. Consider a case where the PWM error ERR1 is smaller than ERR2 as shown in FIG. 6b. In this case, the PWM ramp amplitude reduces for TDM1. Since the slope of the PWM ramp signal is kept constant, the amplitude of the PWM ramp signal for TDM2 increases. The PWM switches are controlled based on these ramp signals. As shown in the graph, the time periods 'P' ON1 (PWM switch 123 ON time in TDM1), 'P' OFF1 (PWM switch 123 OFF time in TDM1) and 'P' ON2 (PWM switch 123 ON time in TDM2) and 'P' OFF2 (PWM switch 123 OFF time in TDM2) are the controls for switching the PWM switches of the PWM switching stage in each switching cycle.

Embodiments of the invention are explained considering a buck type switching regulator as an example. However, embodiments of the invention can also be extended to non-buck type regulators and other switching devices.

In the foregoing discussion, the term "connected" means at least either a direct electrical connection between the devices connected or an indirect connection through one or more passive or active intermediary devices. The term "circuit" means at least either a single component or a multiplicity of components, either active or passive, that are connected together to provide a desired function. The term "signal" means at least one current, voltage, charge, data, or other signal.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The forgoing description sets forth numerous specific details to convey a thorough understanding of the invention. However, it will be apparent to one skilled in the art that the invention may be practiced without these specific details. Well-known features are sometimes not described in detail in order to avoid obscuring the invention. Other variations and embodiments are possible in light of above teachings, and it is thus intended that the scope of invention not be limited by this Detailed Description, but only by the following Claims.

What is claimed is:

1. A single inductor multiple output switching device comprising:
    a plurality of time division multiplexing switches for switching current through an inductor of the single inductor multiple output switching device, the plurality of time division multiplexing switches producing a plurality of outputs;
    an error calculation circuit operatively coupled to the plurality of outputs for determining a calculated error from the errors of plurality of outputs, based on a difference of the errors of the outputs if the errors are different, which senses a change in output voltages of the plurality of outputs;

a time slot generation circuit that generates a plurality of time slots for controlling the plurality of time division multiplexing switches according to the calculated error; and a pulse width modulation control circuit operatively coupled to the time slot generation circuit for controlling, according to the time slot, a plurality of pulse width modulation switches of a switching stage of the single inductor multiple output switching device capable of operating in a continuous conduction mode of operation.

2. The single inductor multiple output switching device of claim 1, wherein the error calculation circuit comprises a plurality of amplifiers for comparing errors of the plurality of outputs that determines the calculated error.

3. The single inductor multiple output switching device of claim 1, wherein the time slot generation circuit comprises a plurality of comparators for comparing the calculated error with a time reference signal that generates the plurality of time slots.

4. The single inductor multiple output switching device of claim 1, wherein the pulse width modulation control circuit comprises a plurality of ramp generators that generate a plurality of ramp signals from the time information of the calculated error; and a plurality of comparators that compare the errors of plurality of outputs with a plurality of ramp signals.

5. The single inductor multiple output switching device of claim 1, wherein the pulse width modulation control circuit controls the plurality of pulse width modulation switches such that current in the inductor is ramped up and ramped down for each of the plurality of time slots thereby minimizing cross regulation of the plurality of outputs.

6. The single inductor multiple output switching device of claim 5, wherein a peak current level in the inductor is minimized.

7. The single inductor multiple output switching device of claim 1, wherein the plurality of outputs comprises two outputs.

8. The single inductor multiple output switching device of claim 7, wherein the calculated error is determined by dividing a total time period equally into two time slots if the errors of the two outputs are equal.

9. The single inductor multiple output switching device of claim 1, wherein the plurality of outputs comprises three outputs.

10. The single inductor multiple output switching device of claim 9, wherein the calculated error is determined by performing at least one of a sequential search and a binary search of the errors of the three outputs.

11. The single inductor multiple output switching device of claim 1, wherein the plurality of outputs comprises four outputs.

12. The single inductor multiple output switching device of claim 11, wherein the calculated error is determined by performing at least one of a sequential search and a binary search of the errors of the four outputs.

13. A method for regulating a single input multiple output switching device operating in continuous conduction mode comprising:

determining a calculated error from errors of a plurality of outputs based on a difference of the errors of the outputs if the errors are different in an error calculation circuit which senses a change in output voltages of the plurality of outputs in the single input multiple output switching device, the plurality of outputs produced by a plurality of time division multiplexing switches;

generating a time slot according to the calculated error; and switching current through an inductor of the device dynamically according to the time slot, a plurality of pulse width modulation switches of a switching stage of the single input multiple output switching device being capable of operating in a continuous conduction mode of operation.

14. The method of claim 13 and further comprising:
converting the calculated error into time information with a counter and a clock signal of known time period; and generating the time slot according to the time information.

15. The method of claim 14 and further comprising:
generating a plurality of ramp signals from the time information, and wherein generating a time slot comprises comparing the errors of the plurality of outputs with the plurality of ramp signals.

16. The method of claim 13, wherein determining a calculated error comprises performing at least one of a sequential search and a binary search of the errors of the outputs.

17. The method of claim 13 and further comprising sharing loop components of a pulse width modulation control loop and a time division multiplexing control loop of the single input multiple output switching device.

18. A single inductor multiple output switching device comprising:

a plurality of time division multiplexing switches for switching current through an inductor of the single inductor multiple output switching device, the plurality of time division multiplexing switches producing at least three outputs;

an error calculation circuit operatively coupled to the outputs for determining a calculated error from errors of the outputs by performing at least one of a sequential search and a binary search of the errors, which senses a change in output voltages of the outputs;

a time slot generation circuit that generates a plurality of time slots for controlling the plurality of time division multiplexing switches according to the calculated error; and a pulse width modulation control circuit operatively coupled to the time slot generation circuit for controlling, according to the time slot, a plurality of pulse width modulation switches of a switching stage of the single inductor multiple output switching device capable of operating in a continuous conduction mode of operation.

19. The single inductor multiple output switching device of claim 18 wherein the time slot generation circuit comprises a plurality of comparators for comparing the calculated error with a time reference signal that generates the plurality of time slots.

20. The single inductor multiple output switching device of claim 18, wherein the pulse width modulation control circuit comprises a plurality of ramp generators that generate a plurality of ramp signals from time information of the calculated error; and a plurality of comparators that compare the errors of plurality of outputs with a plurality of ramp signals.

* * * * *